(12) United States Patent
Holmberg et al.

(10) Patent No.: US 8,780,485 B2
(45) Date of Patent: Jul. 15, 2014

(54) DATA TRANSFER OF A LINEAR TAPE DRIVE

(75) Inventors: Mike Alan Holmberg, Eagle, ID (US); John D. Hampton, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 129 days.

(21) Appl. No.: 13/453,738

(22) Filed: Apr. 23, 2012

(65) Prior Publication Data
US 2013/0279041 A1   Oct. 24, 2013

(51) Int. Cl.
*G11B 21/02* (2006.01)

(52) U.S. Cl.
USPC .............................. 360/75; 360/110; 360/134

(58) Field of Classification Search
USPC ................. 360/75, 8, 31, 73.04, 73.08, 69, 60
See application file for complete search history.

(56) References Cited

U.S. PATENT DOCUMENTS

| 7,724,465 | B2 | 5/2010 | Koeppe | |
| 7,746,588 | B2 * | 6/2010 | Koeppe et al. | 360/48 |
| 2002/0060961 | A1 * | 5/2002 | Yamamoto | 369/47.11 |
| 2002/0191321 | A1 * | 12/2002 | Anderson | 360/60 |
| 2003/0110332 | A1 * | 6/2003 | Suzuki et al. | 710/60 |
| 2004/0179284 | A1 * | 9/2004 | Martin | 360/8 |
| 2006/0256466 | A1 * | 11/2006 | Katagiri et al. | 360/75 |
| 2008/0007856 | A1 * | 1/2008 | Tango et al. | 360/53 |
| 2008/0285166 | A1 | 11/2008 | Katagiri et al. | |
| 2009/0125649 | A1 | 5/2009 | Goker et al. | |
| 2010/0095029 | A1 | 4/2010 | Katagiri et al. | |
| 2011/0116185 | A1 * | 5/2011 | Katagiri et al. | 360/73.04 |
| 2011/0267717 | A1 | 11/2011 | Cherubini et al. | |
| 2013/0258519 | A1 * | 10/2013 | Poorman et al. | 360/75 |
| 2014/0040655 | A1 * | 2/2014 | Fasen et al. | 714/2 |

\* cited by examiner

*Primary Examiner* — Tan X Dinh

(57) ABSTRACT

An example provides a system and method for decreasing a data transfer rate of a linear tape drive. The method includes detecting, within a linear tape drive, a first data transfer rate of a host computing system to determine whether the first data transfer rate is slower than a second data transfer rate of a magnetic tape head within the linear tape drive. The method also includes, in response to determining that the first data transfer rate is slower than the second data transfer rate, deactivating a specified number of data write elements within the magnetic tape head, wherein deactivating the specified number of the data write elements includes decreasing the second transfer rate.

20 Claims, 4 Drawing Sheets

100

222

400

DATA TRANSFER OF A LINEAR TAPE DRIVE

BACKGROUND

Linear tape drives are used for computer backup and archiving. In linear recording, data tracks are typically written in a parallel fashion from the beginning to the end of the magnetic tape. The writing of the data tracks is performed using a magnetic tape head that is disposed within a linear tape drive. The magnetic tape head may include a write array with a number of data write elements, or channels, disposed therein.

BRIEF DESCRIPTION OF THE DRAWINGS

Certain examples are described in the following detailed description and in reference to the drawings, in which.

DETAILED DESCRIPTION OF SPECIFIC EXAMPLES

In general, linear tape drives utilize all of the available channels to write data to magnetic tapes within a range, e.g., typically 3:1, of magnetic tape speeds. This results in a normal range of transfer rates for the linear tape drive. However, if a host system with a slow data transfer rate is connected to a linear tape drive with relatively fast transfer rates, the linear tape drive performs recurring stop-rewind-start operations to accommodate for the difference in data transfer rates. Such stop-rewind-start operations may result in significant wear and tear on the magnetic tape and the linear tape drive, negatively impacting product reliability.

Linear tape drives often attempt to accommodate slower host systems by using large data buffers to store host data. Additionally, the drives may lower the speed of the magnetic tape within the linear tape drive. If the magnetic tape speed is allowed to drop below an acceptable level, stick-slip friction occurs between the magnetic tape head and the magnetic tape. Stick-slip friction may cause the magnetic tape head and the magnetic tape to alternate between sticking to each other and sliding over each other, resulting in corresponding changes in the force of friction. To prevent this stick-slip from occurring, the linear tape drive cannot slow the magnetic tape speed below a pre-defined limit. If the host system is not in accord with the transfer rate of the linear tape drive, stop-rewind-start operations result.

Systems and methods described herein provide a linear tape drive that is configured to decrease the transfer rate for writing data to a magnetic tape. This may be accomplished by decreasing the number of data write elements, or channels, that are used to write the data to the magnetic tape. This may be performed in response to determining that a host is transferring data to the linear tape drive at a transfer rate that is lower than the minimum data transfer rate of the linear tape drive.

Figure 1:
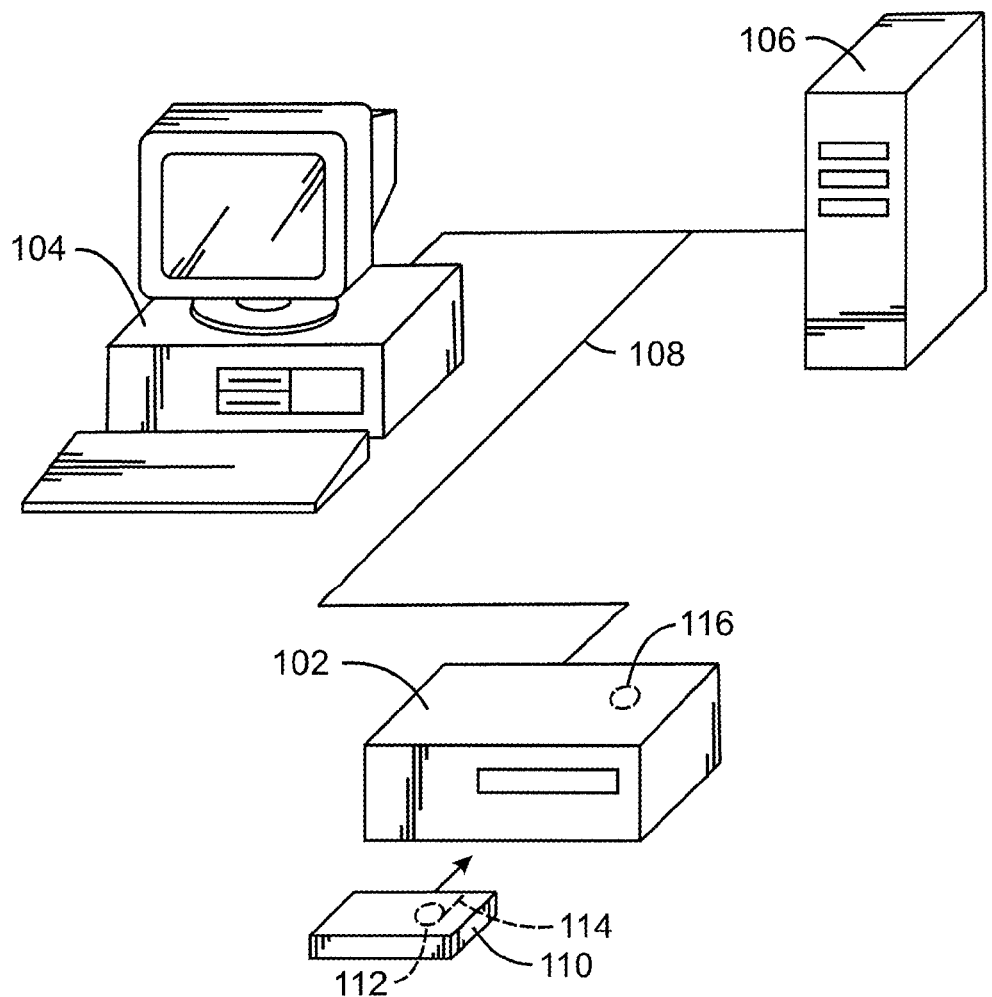
FIG. 1 is a schematic of a computer network environment that may be used.

FIG. 1 is a schematic of a computer network environment 100 that may be used. The computer network environment 100 may include a linear tape drive 102 that is communicably coupled to a computer 104 or a network server 106, or both, via a wired connection 108. However, in various examples, the linear tape drive 102 is communicably coupled to the computer 104 or the network server 106, or both, via a wireless connection, such as a wide area network (WAN), local area network (LAN), or the Internet.

The computer 104 or the network server 106, or both, may be configured to read data from and write data to the linear tape drive 102. The computer 104 and the network server 106, together or individually, may form a host system for the linear tape drive 102. In various examples, the linear tape drive 102 is a data storage and retrieval device that is configured in the form of a stand-alone computer linear tape drive. In other examples, the linear tape drive 102 is disposed within the computer 104 or the network server 106. For example, the linear tape drive 102 may be supported in a bay inside a housing of the computer 104 or the network server 106.

As shown in FIG. 1, the linear tape drive 102 is configured to use tape cartridges such as a data tape cartridge 110. The data tape cartridge 110 may be a single-reel linear tape cartridge. The data tape cartridge 110 may include a magnetic tape carrier in the form of a reel 112 and magnetic tape 114 that is wound onto the reel 112. In addition, a second reel 116 may be included within the linear tape drive 102, which is configured to engage the magnetic tape 114. Thus, the second reel 116 works with the reel 112 to form a magnetic tape carrier. In other examples, the data tape cartridge 110 includes two reels 112.

In some examples, the magnetic tape 114 is configured to have a width of approximately one inch. The magnetic tape 114 will also have a length extending in a direction perpendicular to the width, with a number of parallel tracks being defined across the width of the magnetic tape 114. Such tracks extend in the direction of the length of the magnetic tape 114, and are used to store data as well as servo information.

It is to be understood that the computer network environment 100 may include any number of additional components not shown in FIG. 1. In addition, any number of the components shown in FIG. 1 may not be included within the computer network environment 100, depending on the specific application.

Figure 2:
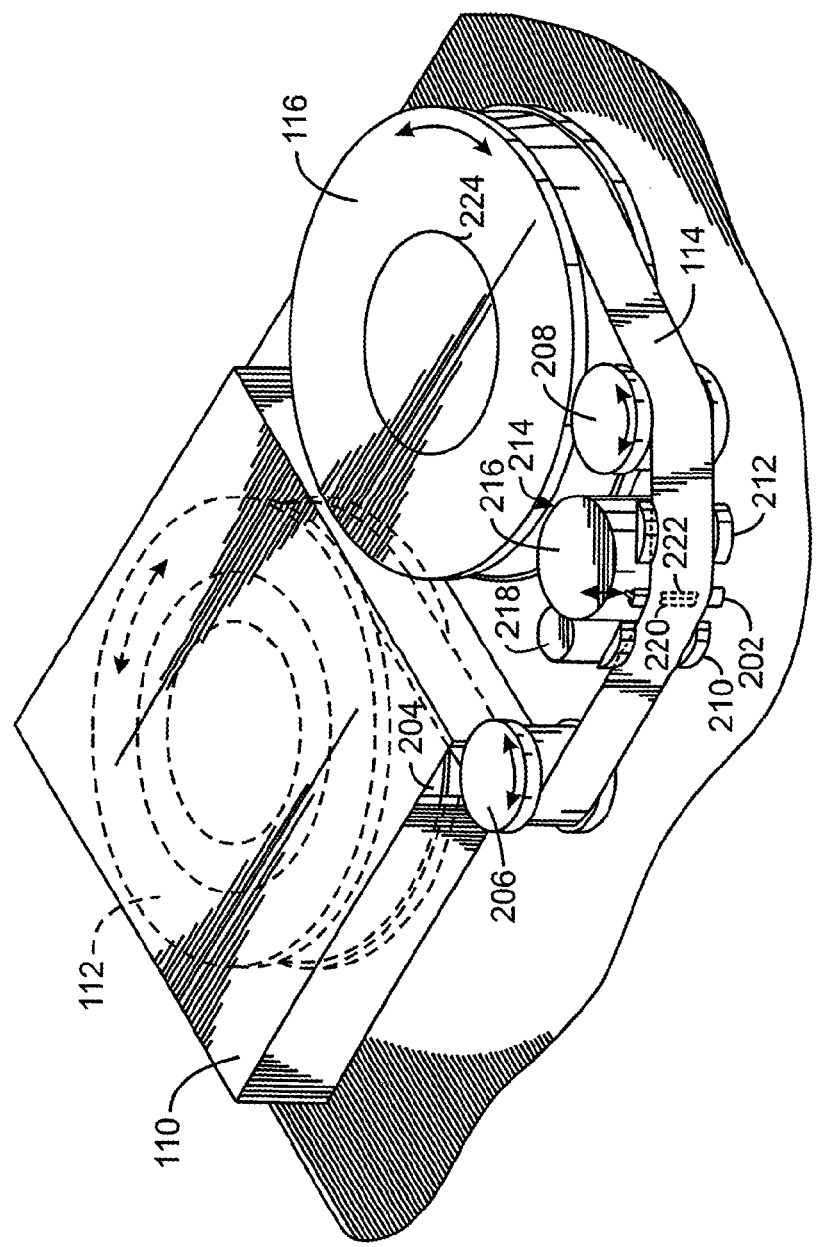
FIG. 2 is a schematic of the internal operating configuration of the linear tape drive after the insertion of the data tape cartridge.

FIG. 2 is a schematic of the internal operating configuration of the linear tape drive 102 after the insertion of the data tape cartridge 110. Like numbered items are as described with respect to FIG. 1. The loading of the data tape cartridge 110 may be performed such that the magnetic tape 114 is positioned for linear movement along a transducer, such as a magnetic tape head 202

As shown in FIG. 2, the magnetic tape 114 exits the data tape cartridge 110 via an exit aperture 204. The magnetic tape 114 may then travel around roller guides 206 and 208, as well as stationary guides 210 and 212. The movement of the magnetic tape 114 may be such that tension is applied to the magnetic tape head 202 by the magnetic tape 114 during the normal operation of the linear tape drive 102.

The magnetic tape head 202 may be supported for up-and-down movement by a linear actuator 214. The linear actuator 214 is shown in FIG. 2 in a simplified form as a cylindrical body with an actuator housing 216. However, it is to be understood that the linear actuator 214 may be formed from any of a number of configurations presently understood in the art, wherein a linear-magnet displacement member enables movement of the magnetic tape head 202 transverse to the travel direction of the magnetic tape 114 in response to input from a controller 218. The controller 218 may include firmware that is configured to direct the functioning of the hardware within the linear tape drive 102. For example, the controller 218 may direct the linear actuator 214 to effect the movement of the magnetic tape head 202. Such a movement of the magnetic tape head 202 may allow read and write sensing elements on the magnetic tape head 202 to be properly positioned onto tracks of data contained on the magnetic tape 114.

The magnetic tape head 202 is configured to convert electrical data signals received from the computer 104 or the network server 106, for example, to magnetic fluctuations that are contained within the magnetic tape 114, and vice versa. In various examples, the magnetic tape head 202 includes a read array 220 including a number of read data elements (not shown) that are configured to read data from the magnetic tape 114. The magnetic tape head 202 may also include a write array 222 including a number of write data elements (not shown) that are configured or write data to the magnetic tape 114. In some examples, the magnetic tape head 202 may include one read array 220 that is located upstream of the write array 222 and another read array 220 that is located downstream of the write array. In some examples, the magnetic tape head 202 is configured to deactivate any number of the data write elements in response to feedback from the controller 218.

In various examples, the second reel 116, i.e., the reel that is built into the linear tape drive 102, includes a leader block assembly 224 including a number of leaders. The leader block assembly 224 may enable the loading and unloading of the magnetic tape 114 during the loading and unloading of the data tape cartridge 110 within the linear tape drive 102. The leader block assembly 224 may be any of a number of different types of leader block assemblies that are presently understood in the art.

It is to be understood that the linear tape drive 102 may include any number of additional components not shown in FIG. 2. In addition, any number of the components shown in FIG. 2 may not be included within the linear tape drive 102, depending on the specific application.

Figure 3:
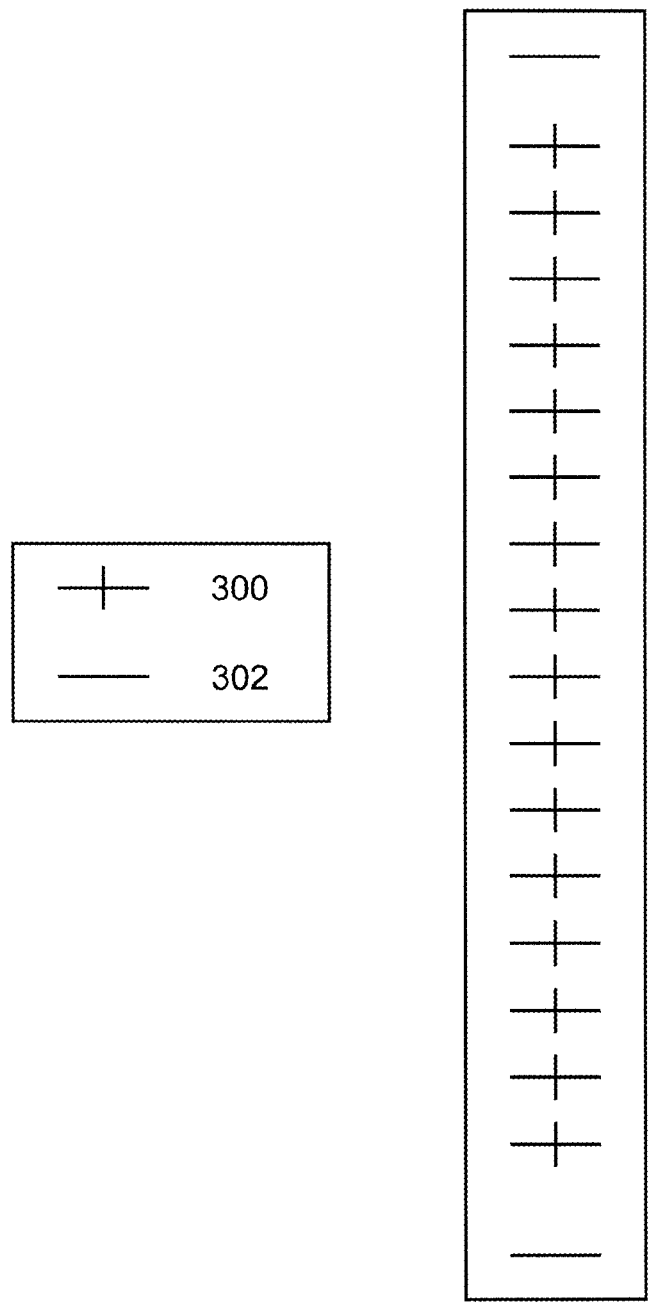
FIG. 3 is a schematic of the write array that may be included within the magnetic tape head of the linear tape drive.

FIG. 3 is a schematic of the write array 222 that may be included within the magnetic tape head 202 of the linear tape drive 102. Like numbered items are as described with respect to FIGS. 1 and 2. The write array 222 may include a number of data write elements 300, or channels, for writing data to the magnetic tape 114. It is to be understood that, while FIG. 3 shows sixteen data write elements 300 within the write array 222, the write array 222 may include any number of data write elements 300. For example, in various examples, the write array 222 includes thirty-two data write elements 300.

In addition, the write array 222 may include a number of servo elements 302 that are configured to read servo code from the magnetic tape 114. The servo elements 302 may also be configured for reading servo information, as well as data, from a portion of the magnetic tape 202. Further, the servo elements 302, in conjunction with the controller 218, may aid in the positioning of the magnetic tape head 202 such that the data read elements or the data write elements are properly aligned with the desired data tracks on the magnetic tape 114.

The write array 222 may be a set of hardware data write elements that is configured to convert an electrical signal that is received from a host system, such as the computer 104 or the network server 106, to a magnetic flux. The write array 222 may also be configured to write the resulting magnetic flux to the magnetic tape 114 that is loaded within the linear tape drive 102 by encoding magnetic fluctuations onto the magnetic tape 114. In addition, the write array 222 may be used to write format information to the magnetic tape 114. The format information may include an appropriate data transfer rate to be used to read data from the magnetic tape during future read and write operations. In some examples, the format information is written to a radio frequency identification (RFID) memory that is disposed within the data tape cartridge 110 containing the magnetic tape 114.

In some examples, the magnetic tape head 202 is configured to deactivate a portion 304 of the data write elements 300, depending on the desired transfer rate for writing data to the magnetic tape 114. This may be performed for instances in which a host system is unable to send data to the linear tape drive 102 at a fast enough rate. The deactivation of the portion 304 of the data write elements 300 may decrease the speed at which data is written onto the magnetic tape 114.

Any number or fraction of the data write elements 300 within the write array 222 may be deactivated, such as, for example, any even numbered fraction of the data write elements 300. According the example shown in FIG. 3, the portion 304 of the data write elements 300 that is deactivated include one half of the data write elements 300 within the write array 222. This may result in a fifty percent decrease in the rate at which the linear tape drive 102 is writing data to the magnetic tape 114.

Such a deactivation process may be performed in response to an input from a host system, such as the computer 104 or the network server 106, for example. In various examples, the controller 218 may determine the desired portion 304 of data write elements 300 to deactivate based on the data transfer rate of the host system. For example, the controller 218 may determine the rate of data into, and out of, a buffer (not shown) of the linear tape drive 102, and may use this information to determine an acceptable transfer rate for writing data to the magnetic tape 114.

Figure 4:
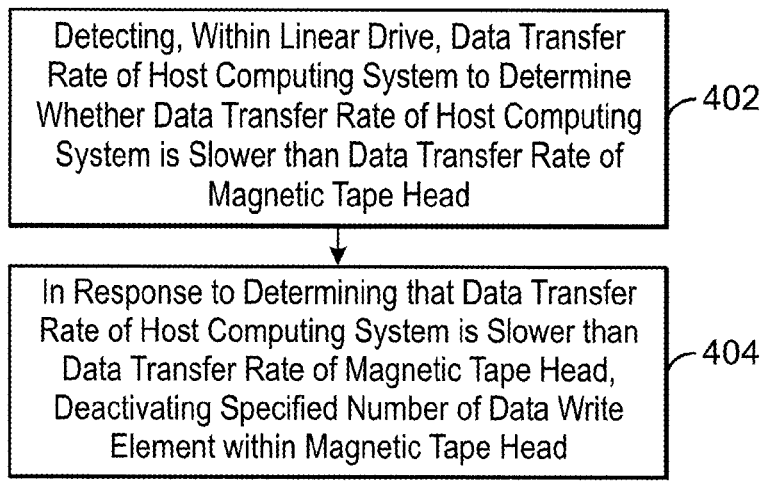
FIG. 4 is a process flow diagram showing a method for decreasing the transfer rate of a linear tape drive.

FIG. 4 is a process flow diagram showing a method 400 for decreasing the transfer rate of a linear tape drive. The method 400 may be implemented within the network computer environment 100 discussed with respect 0 to FIG. 1. For example, the linear tape drive that is utilized according to the method 400 may be the linear tape drive 102, including the magnetic tape head 202 and the controller 218, as discussed above with respect to FIG. 2. In addition, the method 400 may be used to write data to the magnetic tape 214 that is disposed within the data tape cartridge 110, as discussed above with respect to FIGS. 1 and 2.

The method begins at block 402, at which a data transfer rate of a host computing system is detected within a linear tape drive to determine whether the data transfer rate of the host computing system is slower than a data transfer rate of a magnetic tape head within the linear tape drive. In various examples, detecting the data transfer rate of the host computing system includes determining the rate of data supplied to the buffer of the linear tape drive. This may be accomplished using a controller that includes firmware that is capable to detecting such information. The data within the buffer may include data that is to be written to a magnetic tape that is disposed within the linear tape drive. Further, in some examples, the linear tape drive is communicably coupled to more than one host computing system, and the data transfer rate is an overall incoming data transfer rate from all of the host computing systems.

At block 404, in response to determining that the data transfer rate of the host computing system is slower than the data transfer rate of the magnetic tape head, a specified number of data write elements within the magnetic tape head are deactivated. The deactivation of the specified number of data write elements may result in a decrease in the data transfer rate of the magnetic tape head. More specifically, the deactivation of the specified number of data write elements may result in a decrease in the rate at which data is written to the magnetic tape that is disposed within the linear tape drive.

Further, in some examples, the specified number of data write elements are deactivated in response to determining that the data transfer rate of the host computing system is below a specified threshold value. The specified threshold value may be the lowest data transfer rate at which the magnetic tape head and the magnetic tape are moving at a fast enough speed to support the proper functioning of the linear tape drive.

Various techniques may be used to determine the specified number of data write elements to deactivate. For example, the specified number of data write elements to deactivate may be determined based on a desired value of the data transfer rate of the magnetic tape head, wherein the desired value of the data transfer rate of the magnetic tape head is equal to the data transfer rate of the host computing system. In addition, the specified number of data write elements may be any fraction of the total number of data write elements within a particular array of the magnetic tape head. For example, the specified number of data write elements may be one half, one fourth, or one eighth of the total number of data write elements.

The magnetic tape head may use the active data write elements to write data to the magnetic tape that is disposed within the linear tape drive. Because not all of the data write elements, or channels, of the magnetic tape head are used to write the data, a certain number of data tracks within the magnetic tape will remain empty for that pass of the tape over the head. Subsequent passes of the tape over the head could activate the alternate write elements to effectively fill in the blank spaces on tape, thereby achieving the full capacity point of the tape with more passes over the head. For example, for the instance in which one half of the data write elements are deactivated, every other data track on the magnetic tape may remain empty. Thus, the linear tape drive may be configured to write format information to the magnetic tape, or to a RFID memory of the data tape cartridge containing the magnetic tape. Such format information may allow for the proper reading of the data from the magnetic tape at a subsequent point in time.

The process flow diagram of FIG. 4 is not intended to indicate that the steps of the method 400 are to be executed in any particular order, or that all of the steps of the method 400 are to be included in every case. Further, any number of additional steps may be included within the method 400, depending on the specific application. For example, the method 400 may include, in response to determining that the data transfer rate of the host computing system is faster than the data transfer rate of the magnetic tape head, reactivating any of the specified number of data elements within the magnetic tape head. This may result in an increase in the data transfer rate of the magnetic tape head. This may be performed in response to determining that the data transfer rate of the host computing system has increased, or that the data transfer rate of the magnetic tape head has decreased below the data transfer rate of the host computing system.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A linear tape drive, comprising:
   a controller configured to determine a data transfer rate of a host computing system based on an amount of data contained within a buffer of the linear tape drive; and
   a magnetic tape head, comprising a write array, the write array comprising a plurality of data write channels, wherein the magnetic tape head is configured to decrease a number of active data write channels if the data transfer rate of the host computing system is below a specified threshold value.

2. The linear tape drive of claim 1, wherein decreasing the number of active data write channels comprises decreasing a data transfer rate of the magnetic tape head.

3. The linear tape drive of claim 2, wherein decreasing the data transfer rate of the magnetic tape head comprises decreasing a rate at which data is written to magnetic tape disposed within the linear tape drive.

4. The linear tape drive of claim 1, wherein the data contained within the buffer comprises data received from the host computing system.

5. The linear tape drive of claim 1, wherein the data transfer rate of the host computing system comprises an overall incoming data transfer rate from a plurality of host computing systems.

6. The linear tape drive of claim 1, wherein the linear tape drive is configured to write the data contained within the buffer to magnetic tape disposed within the linear tape drive using the active data write channels.

7. The linear tape drive of claim 6, wherein the linear tape drive is configured to write format information to the magnetic tape.

8. A method for decreasing a data transfer rate of a linear tape drive, comprising:
   detecting, within a linear tape drive, a first data transfer rate of a host computing system to determine whether the first data transfer rate is slower than a second data transfer rate of a magnetic tape head within the linear tape drive;
   in response to determining that the first data transfer rate is slower than the second data transfer rate, deactivating a specified number of data write channels within a write array of the magnetic tape head, wherein deactivating the specified number of the data write channels comprises decreasing the second data transfer rate.

9. The method of claim 8, wherein decreasing the second data transfer rate comprises decreasing a rate of writing data received from the host computing system to magnetic tape within the linear tape drive.

10. The method of claim 8, comprising deactivating the specified number of the data write channels in response to determining that the first data transfer rate is below a specified threshold value.

11. The method of claim 8, wherein detecting the first data transfer rate of the host computing system comprises determining an amount of data contained within a buffer of the linear tape drive.

12. The method of claim 8, comprising determining the specified number of the data write channels to deactivate based on a desired value of the second data transfer rate.

13. The method of claim 12, wherein the desired value of the second data transfer rate comprises a value of the first data transfer rate.

14. The method of claim 8, wherein the specified number of the data write channels comprises an even numbered fraction of a total number of the data write elements.

15. A system for writing data to a magnetic tape, comprising:
 a host computing system configured to send data to and receive data from a linear tape drive at a data transfer rate; and
 the linear tape drive, comprising a magnetic tape head comprising data write channels disposed within an array, wherein the linear tape drive is configured to decrease a number of active data write channels within the magnetic tape head based on the data transfer rate of the host computing system.

16. The system of claim 15, wherein decreasing the number of active data write channels based on the data transfer rate of the host computing system comprises decreasing a second data transfer rate of the linear tape drive in response to determining that the data transfer rate of the host computing system is slower than the second data transfer rate of the linear tape drive.

17. The system of claim 15, wherein decreasing the number of active data write channels based on the data transfer rate of the host computing system comprises decreasing a second data transfer rate of the linear tape drive in response to determining that the data transfer rate of the host computing system is lower than a specified threshold value.

18. The system of claim 15, wherein the system comprises a plurality of host computing systems, and wherein the data transfer rate comprises an overall data transfer rate of the plurality of host computing systems.

19. The system of claim 15, wherein the host computing system and the linear tape drive are communicably coupled via a network.

20. The system of claim 15, wherein the linear tape drive is disposed within the host computing system.

* * * * *